United States Patent
Lin et al.

(10) Patent No.: US 9,466,101 B2
(45) Date of Patent: Oct. 11, 2016

(54) DETECTION OF DEFECTS ON WAFER DURING SEMICONDUCTOR FABRICATION

(71) Applicant: Taiwan Semiconductor Manufacturing Company Limited, Hsin-Chu (TW)

(72) Inventors: Chun-Hsien Lin, Hsin-chu (TW); Liu Bo-Tsun, Taipei (TW); Chin-Ti Ko, Zhudong Township (TW); Wu Cheng-Hung, Hsinchu (TW); Kuo-Hung Chao, Hsinchu (TW); Peng Jui-Chun, Hsinchu (TW); Fei-Gwo Tsai, Taipei (TW); Heng-Hsin Liu, New Taipei (TW); Jong-I Mou, Hsinchu (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 274 days.

(21) Appl. No.: 13/951,243

(22) Filed: Jul. 25, 2013

(65) Prior Publication Data

US 2014/0328534 A1    Nov. 6, 2014

Related U.S. Application Data (60) Provisional application No. 61/818,378, filed on May 1, 2013.

(51) Int. Cl.
*G06K 9/00* (2006.01)
*G06T 7/00* (2006.01)

(52) U.S. Cl.
CPC ... *G06T 7/0006* (2013.01); *G06T 2207/20061* (2013.01); *G06T 2207/30148* (2013.01)

(58) Field of Classification Search
CPC ............. G06K 9/03; G06K 9/40; G06T 2207/20061; G06T 2207/30148
See application file for complete search history.

(56) References Cited

U.S. PATENT DOCUMENTS

| 8,502,146 B2* | 8/2013 | Chen | H01L 22/12 250/306 |
| 8,737,717 B2* | 5/2014 | Lin | G06K 9/48 382/141 |
| 2004/0052411 A1* | 3/2004 | Qian | G06T 7/0002 430/5 |

(Continued)

OTHER PUBLICATIONS

Shoji, Masahiro, and Nobuyasu Horiuchi. "NGL data conversion system." Photomask and Next Generation Lithography Mask Technology XII. International Society for Optics and Photonics, 2005.*

(Continued)

*Primary Examiner* — Stephen R Koziol
*Assistant Examiner* — Jonathan S Lee
(74) *Attorney, Agent, or Firm* — Cooper Legal Group, LLC (57) ABSTRACT

Among other things, systems and techniques are provided for detecting defects on a wafer based upon non-correctable error data yielded from a scan of the wafer to determine a topology of the wafer. The non-correctable error data is reconstructed to generate a non-correctable error image map, which is transformed to generate a projection. In some embodiments, the non-correctable error image map is transformed via a feature extraction transform such as a Hough transform or a Radon transform. In some embodiments, the projection is compared to a set of rules to identify a signature in the non-correctable error image map indicative of a defect.

20 Claims, 5 Drawing Sheets

(56) References Cited

U.S. PATENT DOCUMENTS

| | | | | |
|---|---|---|---|---|
| 2006/0242619 A1* | 10/2006 | Pang | G03F 1/84 | 716/139 |
| 2007/0031026 A1* | 2/2007 | Kurihara | G06T 7/001 | 382/149 |
| 2007/0160281 A1* | 7/2007 | Marutyan | | 382/149 |
| 2009/0226075 A1* | 9/2009 | Hiroi | G01N 21/95607 | 382/149 |
| 2009/0262320 A1* | 10/2009 | Staals | G03F 9/7034 | 355/55 |
| 2010/0154521 A1* | 6/2010 | Budach | B82Y 35/00 | 73/105 |
| 2010/0290696 A1* | 11/2010 | Jeong | G01B 11/0608 | 382/147 |
| 2011/0069895 A1* | 3/2011 | Ueno | G01N 21/9501 | 382/218 |
| 2011/0271239 A1* | 11/2011 | Lu | G03F 1/70 | 716/55 |
| 2012/0008127 A1* | 1/2012 | Tel et al. | | 355/77 |
| 2012/0194792 A1* | 8/2012 | Sapp | G03F 7/70066 | 355/55 |
| 2012/0242824 A1* | 9/2012 | Takahashi | G01B 11/0608 | 348/86 |

OTHER PUBLICATIONS

Rangayyan, Rangaraj M. Biomedical image analysis. CRC press, 2004.*

* cited by examiner

DETECTION OF DEFECTS ON WAFER DURING SEMICONDUCTOR FABRICATION

BACKGROUND

Semiconductor fabrication generally involves performing a plurality of processes on a semiconductor substrate, such as a wafer. During one or more of such processes, defects can occur on the wafer. By way of example, a coating defect can occur within a coating applied to the wafer. While some such defects are repairable, other defects are non-repairable and cause semiconductor chips, integrated circuits, or the like derived from the fabrication process to operate undesirably.

SUMMARY

This summary is provided to introduce a selection of concepts in a simplified form that are further described below in the detailed description. This summary is not intended to be an extensive overview of the claimed subject matter, identify key factors or essential features of the claimed subject matter, nor is it intended to be used to limit the scope of the claimed subject matter.

According to some embodiments, systems and techniques for detecting defects on a wafer are provided, wherein "wafer" is meant to include zero or more materials, layers of materials, etc. applied thereto. An imaging device, such as a laser, is configured to scan various locations of the wafer, including materials applied thereto, to measure a height of, or associated with, the wafer at such locations and to determine a topography of the wafer. Data associated with non-correctable errors in the wafer is identified by comparing topography data associated with the topography to a scanner profile, such as a scanner exposure profile, indicative of measurements that would have been acquired under ideal conditions, free of noise, free of correctable errors, or free of non-correctable errors or combination thereof.

In some embodiments, the data associated with non-correctable errors, also referred to as non-correctable error data, is reconstructed to generate a non-correctable error image map indicative of non-correctable errors on the wafer. Such non-correctable errors are indicative of, among other things, one or more of coating defects, column defocus, or scratch-type defects, for example.

In some embodiments, one or more image transforms are applied to the non-correctable error image map to generate a projection. In some embodiments, the image transform(s) is a feature extraction transform configured to identify one or more specified features of the non-correctable error image map. In some embodiments, a Hough transform is applied to the non-correctable error map to generate a Hough projection. In some embodiments, a Radon transform is applied to the non-correctable error map to generate a projection.

In some embodiments, the projection is analyzed to identify a signature, in the non-correctable error image map, indicative of a defect on the wafer. While non-correctable errors may be generally undesirable, some non-correctable errors may be tolerable in some situations depending upon, among other things, the severity of the non-correctable error and/or the location of the non-correctable error. Accordingly, the projection is analyzed to identify the signature of non-correctable errors that are not tolerable and thus labeled as a defect.

The following description and annexed drawings set forth certain illustrative aspects and implementations. These are indicative of but a few of the various ways in which one or more aspects are employed. Other aspects, advantages, and novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. It will be appreciated that elements and structures of the drawings are not necessarily be drawn to scale. Accordingly, the dimensions of the various features is arbitrarily increased or reduced for clarity of discussion.

DETAILED DESCRIPTION

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

During semiconductor fabrication, a set of processes is performed on a semiconductor substrate, such as a wafer, by various fabrication tools. At times during the fabrication process, the wafer is tested for defects. By way of example, to form a photoresist layer on the wafer, a surface of the wafer is coated with a photoresist material, which is then masked, exposed, and developed to provide a patterned photoresist layer on the wafer. In some embodiments it is desirable to test the wafer for coating defects before the photoresist layer is exposed.

Figure 1:
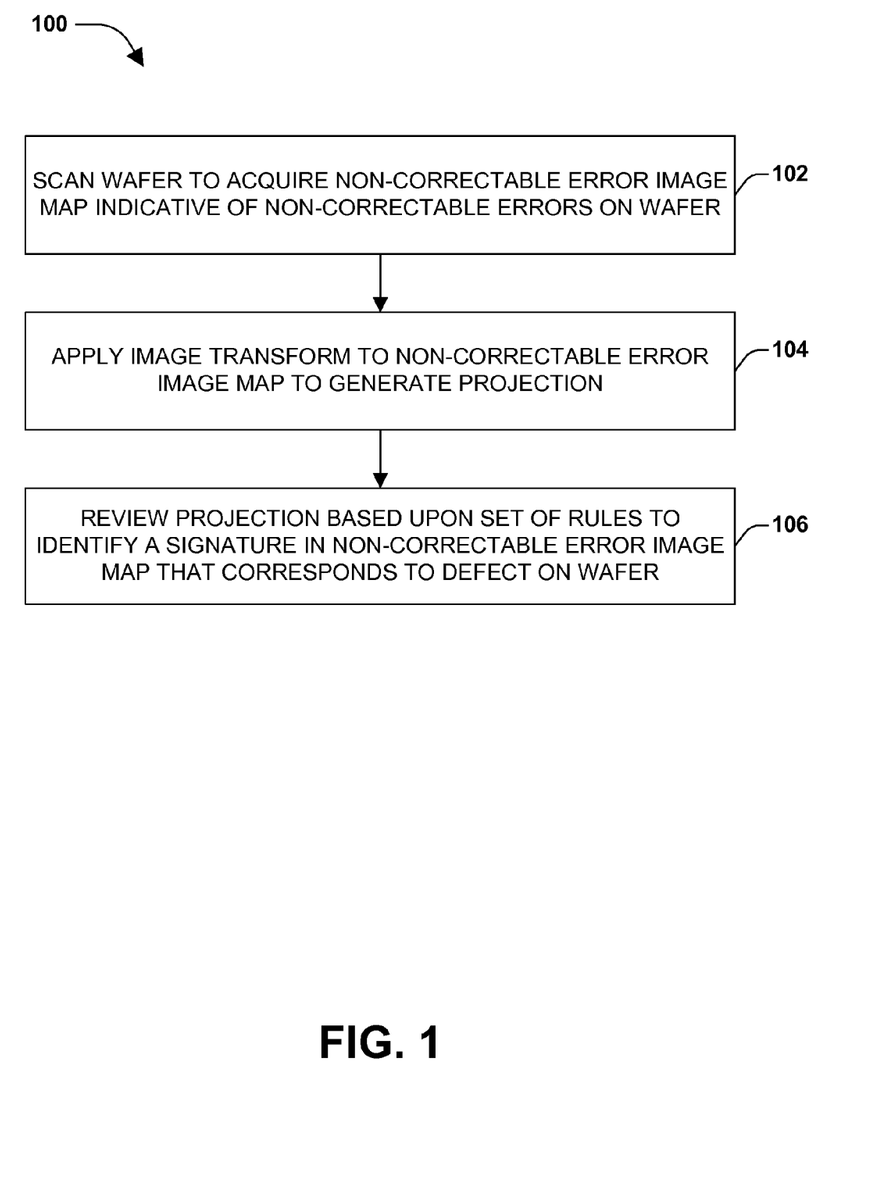
FIG. 1 is a flow diagram illustrating a method for detecting defects on a wafer, according to some embodiments.

FIG. 1 illustrates an example method 100 for detecting defects on the wafer. Such defects include, among other things, one or more of coating defects, column-defocus, or scratch-type defects. In some embodiments, a defect is a cluster of one or more non-correctable errors that are intended to trigger an alarm. For example, in some instances, a user defines a set of rules by which clusters of non-correctable errors are evaluated. If the clusters satisfy the rules, it is determined that the wafer is free of defects. If one or more clusters do not satisfy at least one of the rules, it is determined that the wafer contains a defect. As an example, a cluster of non-correctable errors can correspond to a non-uniformity in a coating applied to the wafer. Such a non-uniformity is evaluated by the method 100 to determine if the non-uniformity is significant enough to label the non-uniformity as a defect.

At 102 in the example method 100, a wafer is scanned to acquire a non-correctable error image map indicative of non-correctable errors on the wafer. In some embodiments, the non-correctable error image map is a 2D image depicting a surface of the wafer, such as a top surface or a bottom surface.

The non-correctable error image map describes a location of one or more non-correctable errors on a wafer and a severity of respective non-correctable errors. By way of example, the severity of a non-correctable error relates to a difference between the measured topology at a location on the wafer and an expected topology at the location on the wafer based upon a scanner profile, such as a scanner exposure profile. In some embodiments, the severity of the non-correctable error is represented by an intensity of a pixel representing the location on the wafer where the non-correctable error is located. In other embodiments, other properties of a pixel are used to represent the severity of the non-correctable error. By way of example, a hue of a pixel is used to represent the severity of the non-correctable error at a location on the wafer represented by the pixel.

In some embodiments, a series of actions are performed to acquire the non-correctable error image map from a scan of the wafer. An example technique for acquiring the non-correctable error image map from the scan is as follows. An imaging component, such as a laser or other wavelength emitting source, is configured to project beams, having a desired wavelength, onto various locations of the wafer from a position substantially above the wafer or below the wafer, for example. Based upon the time it takes for the light to reflect off of the wafer at the various locations or based upon a property of the reflectivity, such as an intensity of the reflected light or beam of light, a height of the wafer at respective locations is determined. By way of example, in some embodiments, the laser measures the height of the wafer at a first location by emitting a first laser beam, adjusts a focal spot of the laser to focus on a second location, and emits a second laser beam to measure the height of the wafer at the second location. Such acts of adjusting and measuring continue until the height of the wafer at a desired number of locations has been measured. In some embodiments, the imaging component measures the height of the wafer at 20,000 locations or more. Based upon the measurements, a topology of a surface of the wafer is determined and compared to a scanner profile, such as a scanner exposure profile, to identify non-correctable errors. Data associated with the non-correctable errors is then reconstructed via iterative, analytical, or other image reconstruction technique to generate a non-correctable error image map from the scan of the wafer. In this way, an image is generated indicative of the non-correctable errors on the wafer.

At 104 in the example method 100, one or more image transforms are applied to the non-correctable error image map to generate a projection. In some embodiments, at least some of the one or more image transformers are feature extraction transforms configured to transform the non-correctable error image map into a set of features relevant to evaluating whether the wafer comprises defects. In some embodiments, the feature extraction transforms are configured to transform the non-correctable error image map into a set of features which correspond to a set of rules used to determine whether a defect is present in the wafer.

In some embodiments, objects having at least one dimension that exceeds a predetermined threshold are identified, where the objects are clusters of one or more non-correctable errors represented in the non-correctable error image map. Accordingly, an image transform configured to identify objects and to determine a longest axis of such objects is used to synthesize the non-correctable error image map into a projection.

In some embodiments, objects having a particular shape are identified. Accordingly, an image transform configured to evaluate edges of objects to identify a shape of respective objects is used to synthesize the non-correctable error image map into a projection.

In some embodiments, objects having a particular area are identified. Accordingly, an image transform configured to identify edges of objects and to determine an area of respective objects is used to synthesize the non-correctable error image map into a projection.

In some embodiments, at least one of the image transforms applied to the non-correctable error image map is a Hough transform or other transform that uses a voting procedure to identify specified shapes in the non-correctable error image map. By way of example, a linear Hough transform is configured to identify linear lines by comparing respective pixels to a neighborhood of pixels. Based upon such a comparison, a determination regarding whether the pixel for which the comparison is being made represents an edge of an object. Based upon whether respective pixels are representative of an edge or not representative of an edge, linear lines between edges of pixels are identified. Accordingly, the output, or projection, of a linear Hough transformer is a matrix, also referred to as an accumulator, which describes the location of the line and a number of pixels positioned on the line. Although reference is made to using a Hough transform to identify linear lines, other shapes can also or instead be identified by the Hough transform. For example, non-linear lines, circles, ellipses, and other shapes can be identified by the Hough transform when one or more parameters of the linear Hough transform are modified.

In some embodiments, at least one of the image transforms applied to the non-correctable error image map is a Radon transform or other integral transform configured to identify an intensity of arbitrary lines through an object. By way of example, the Radon transform is configured to integrate locations along a line to determine an intensity of the line. The output, or projection, of the transformer is generally a sinogram indicative of the locations and intensities of lines represented in the non-correctable error image map.

At 106 in the example method 100, the one or more projections generated at 104 are reviewed based upon a set of rules to identify a signature in the non-correctable error image map that corresponds to a defect on the wafer. By way of example, in some embodiments, the set of rules provide for identifying a defect when an object greater than 5 mm is detected in the non-correctable error image map. Accordingly, the projection(s) generated at 104 is reviewed to determine if any lines are at least 5 mm in length. A line greater than 5 mm in length is indicative of an object, or a cluster of non-correctable errors, that have at least one dimension greater than 5 mm. Thus, a line greater than 5 mm in length is a signature in the non-correctable error image map that corresponds to a defect on the wafer. As another example, at least some of the rules may pertain to a distribution in a projection yielded from a Radon transform. As an example, a rule provides that a defect is present when peaks in the projection follow a specified distribution.

Accordingly, when the projection yielded from a Radon transform comprises a distribution of peaks similar to the specified distribution, the wafer is identified as comprising a defect.

While the foregoing example provides a rule are associated with a static condition (line greater than 5 mm), in some embodiments, at least some rules are associated with a dynamic condition. For example, a rule provides for determining an average line length of lines through objects in the non-correctable error image map and determining whether one or more lines exceed the average line length by more than a specified threshold. Accordingly, the projection(s) generated at 104 is reviewed at 106 to determine an average line length for the lines through objects and to determine whether any of the lines have a magnitude, line length, which exceeds the average line length by more than a specified threshold. In such embodiments, a defect is identified when at least one line has a magnitude that exceeds the average line length by more than the specified threshold.

In some embodiments, an alarm is triggered when a wafer is identified as having a defect. In this way, the system or technicians are made aware of the wafer so that the wafer is pulled from further fabrication, for example.

Figure 2:
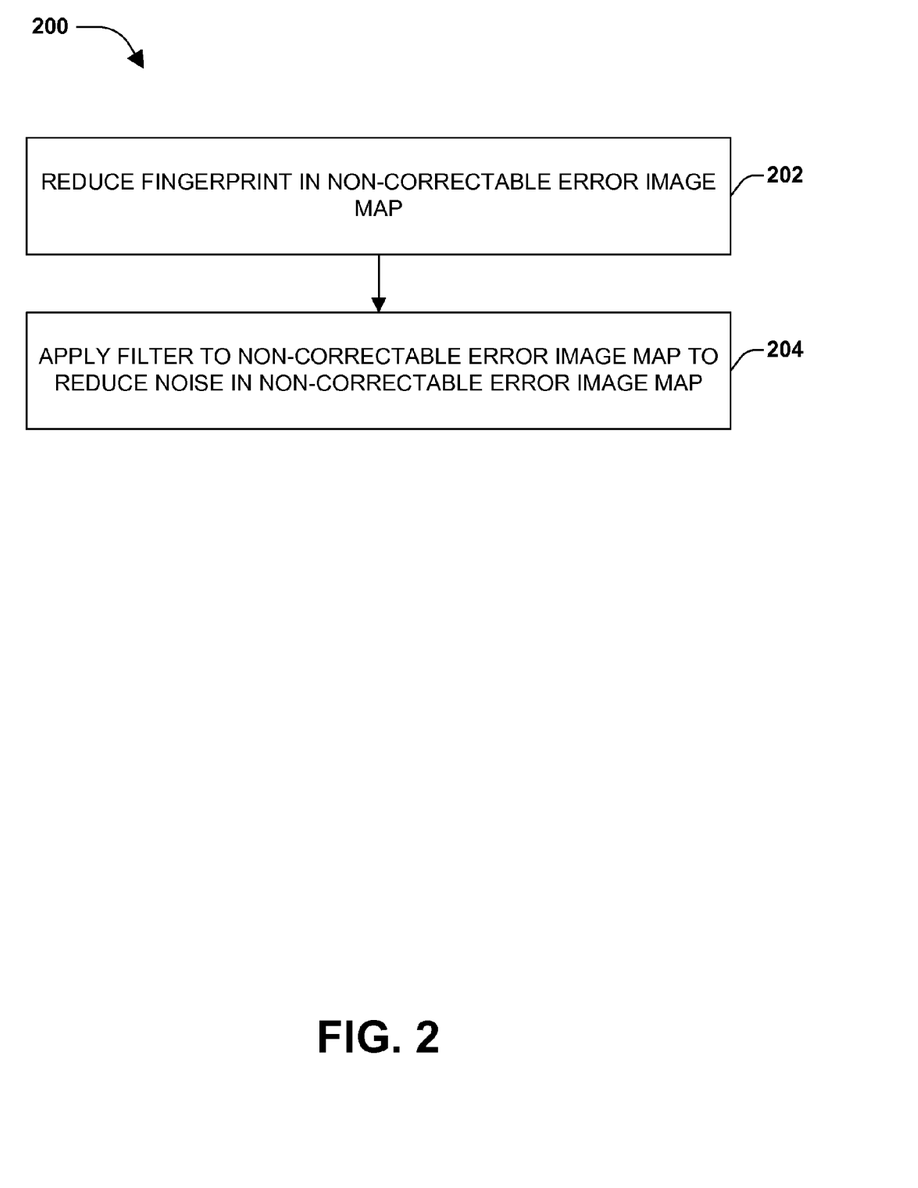
FIG. 2 is a flow diagram illustrating a method for cleaning a non-correctable error image map, according to some embodiments.

Referring to FIG. 2, in some embodiments, it is desirable to clean the non-correctable error image map prior to applying one or more transforms to the non-correctable error image map. In this way, undesirable contributions to the non-correctable error image map, such as caused by noise, chip layout, or fabrication tools, are reduced in the non-correctable error image map.

Accordingly, FIG. 2 illustrates an example method 200 for cleaning a non-correctable error image map. The method 200 comprises reducing a fingerprint, in the non-correctable error image map. In some embodiments, such a fingerprint is caused by a layout of chips on the wafer. In other embodiments, such a fingerprint is caused by one or more tools used during a fabrication process at 202. By way of example, tools used during photolithographic process, such as a chuck configured to support the wafer or a mask configured to mask the wafer for patterning can influence the measurements made during a scan, resulting in the non-correctable error image map comprising contributions made by such tools. In this way, the tool introduces an identifiable fingerprint into the non-correctable error image map, which is removed or at least reduced at 202.

The fingerprint is typically substantially static in nature between images. That is, a contribution of a tool or a chip layout to the non-correctable error image map is typically substantially the same for respective scans of wafers having a similar chip layout. Accordingly, in some embodiments, reducing the fingerprint from the non-correctable error image map at 202 comprises determining a fingerprint for one or more tools or chips layouts and decoupling the fingerprint from the non-correctable error image map. In some examples, determining a fingerprint for one or more tools comprises performing a calibration scan, such as an air scan performed when no wafer is within the imaging field. In some embodiments, determining a fingerprint for a chip layout comprises performing a calibration scan using a calibration wafer that has the chip layout. In some embodiments, decoupling the fingerprint from the non-correctable error image map comprises subtracting the fingerprint from the non-correctable error image map or rather from measurements represented by the non-correctable error image map.

In some embodiments, the method 200 comprises applying a filter to the non-correctable error image map to reduce noise in the non-correctable error image map. In some embodiments, the filter is a sigma filter configured to replace an intensity value of a pixel with an average intensity value of neighboring pixels that are within a specified degree of closeness to the intensity value of the pixel. The specified degree of closeness is referred to as a sigma range. In some embodiments, the sigma range is user-specified. For example, in one embodiment, the sigma filter is a −3 sigma filter or less, where the sigma range is −3 or less. In other embodiments, the sigma filter is a +4 sigma filter, where the sigma range is +4. In still other embodiments, a different sigma range is used.

Other filters that can be used to filter noise in an image include, for example, a low pass filter or an averaging filter. By way of example, an averaging filter is configured to replace an intensity value of a pixel with an average intensity value of neighboring pixels.

FIGS. 3-7 illustrate an example non-correctable error image map at various stages of processing according to at least one of the example method 100 and example 200, for example.

Figure 3:
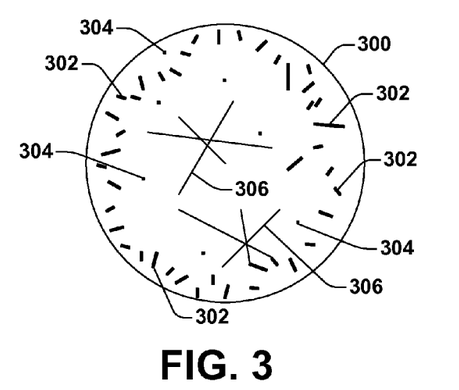
FIG. 3 illustrates a non-correctable error image map, according to some embodiments.

Referring to FIG. 3, an example non-correctable error image map 300 is acquired by reconstructing non-correctable error data acquired from a scan of a wafer. It is to be appreciated that while pixels of the non-correctable error image map 300 are either black, indicative of a non-correctable error, or white, indicative of the lack of a non-correctable error in a location represented by the pixel, in practice such pixels can be colored differently. For example, in some embodiments, a severity of a non-correctable error is represented by an intensity of a pixel representing the non-correctable error. Accordingly, the image is colored various shades of grey. In some embodiments, a severity of a non-correctable error is represented by a hue of a pixel representing the non-correctable error. Accordingly, the image is colored in various hues to represent various levels of severity.

Objects 302 in the non-correctable error image map 300 are clusters of one or more non-correctable errors. The size of an object 302 is dependent upon a number of neighboring non-correctable errors. For example, an object 302 having a smaller area is representative of fewer non-correctable errors than an object 302 having a larger area.

In some embodiments, such as the example embodiment, the non-correctable error image map 300 further represents noise 304 or other contributions not related to non-correctable errors. For example, the non-correctable error image map 300 represents fingerprints 306 of one or more tools used during the fabrication process, such as a chuck used to support the wafer during the scan or a mask applied over the wafer prior to the scan. Accordingly, in some embodiments, the non-correctable error image map 300 undergoes a series of one or more cleanup or pre-processing techniques to reduce or remove undesirable contributions, such as one or more of noise 304 or fingerprints 306, for example.

Figure 4:
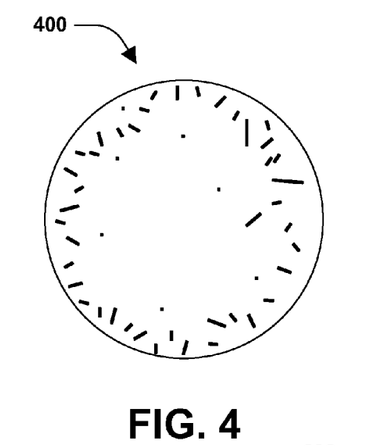
FIG. 4 illustrates a non-correctable error image map, according to some embodiments.

FIG. 4 illustrates a representation 400 of the non-correctable error image map 300 after a process has been performed on the non-correctable error image map 300 to remove one or more fingerprints 306. That is, FIG. 4 illustrates a representation 400 of the non-correctable error image map 300 after a contribution associated with one or more tools is subtracted from measurements represented by the non-correctable error image map 300.

Figure 5:
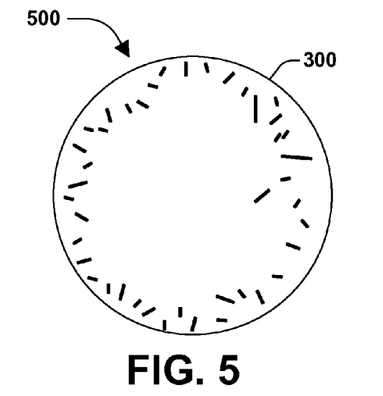
FIG. 5 illustrates a non-correctable error image map, according to some embodiments.

FIG. 5 illustrates a representation 500 of the non-correctable error image map 300 after a further process, such as a sigma filtering process, is performed on the non-correctable error image map 300 to remove noise 304. It is to be appreciated that while the example representations 400 and 500 depict removal of fingerprints 306 and noise 306, in some embodiments, the impact of tools, chip layout, or noise on the non-correctable error image map 300 is merely reduced and not eliminated. For example, an intensity of pixels impacted by the tools, impacted by chip layout, or impacted by the noise is altered to reduce the impact of the tool, the chip layout, or the noise on the non-correctable error image map.

Figure 6:
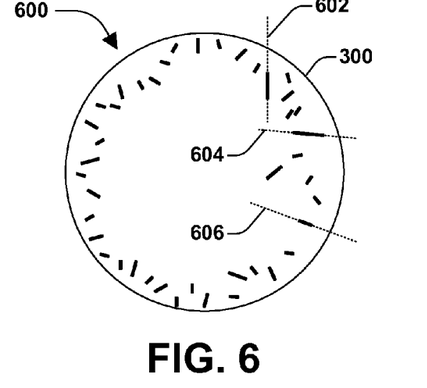
FIG. 6 illustrates a non-correctable error image map, according to some embodiments.

FIG. 6 illustrates a representation 600 of the non-correctable error image map 300 after one or more transforms have been performed on the non-correctable error image map 300. By way of example, a Hough transform is applied to the non-correctable error image map 300 to determine a location and magnitude of one or more linear lines. For example, in the illustrated embodiment, an example set of three linear lines 602, 604, and 606 that have been identified by the Hough transform are shown. For purposes of illustration, such lines have been extended beyond an edge of the object 302. However, it will be appreciated that in some embodiments, such lines are equal to a length of the object.

For respective linear lines 602, 604, and 606, a magnitude of the line is determined. For example, the first linear line 602 and the second linear line 604 measure 6 mm while the third linear line 606 measures 2 mm.

Figure 7:
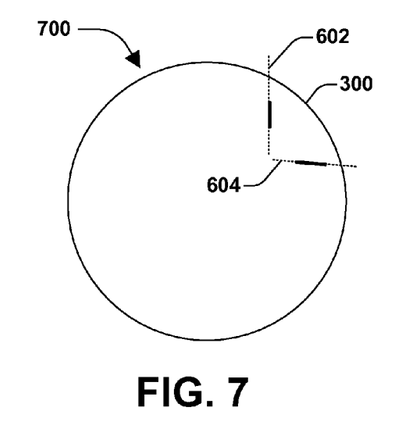
FIG. 7 illustrates a non-correctable error image map, according to some embodiments.

FIG. 7 illustrates a representation 700 of the non-correctable error image map 300 after a set of rules have been applied to identify signatures in the non-correctable error image map 300 indicative of defects. For example, a rule provides that linear lines greater than 5 mm in length are indicative of defects. Accordingly, an object 302 represented by the first linear line 602 and an object represented by the second linear line 604 are signatures indicative of defects. Thus, a wafer from which the non-correctable error image map 300 was derived is defective and further fabrication processes on the wafer are halted, for example. Moreover, parts of the fabrication that contributed to, or at least potentially contributed to, the defects are determined, according to some embodiments.

Figure 8:
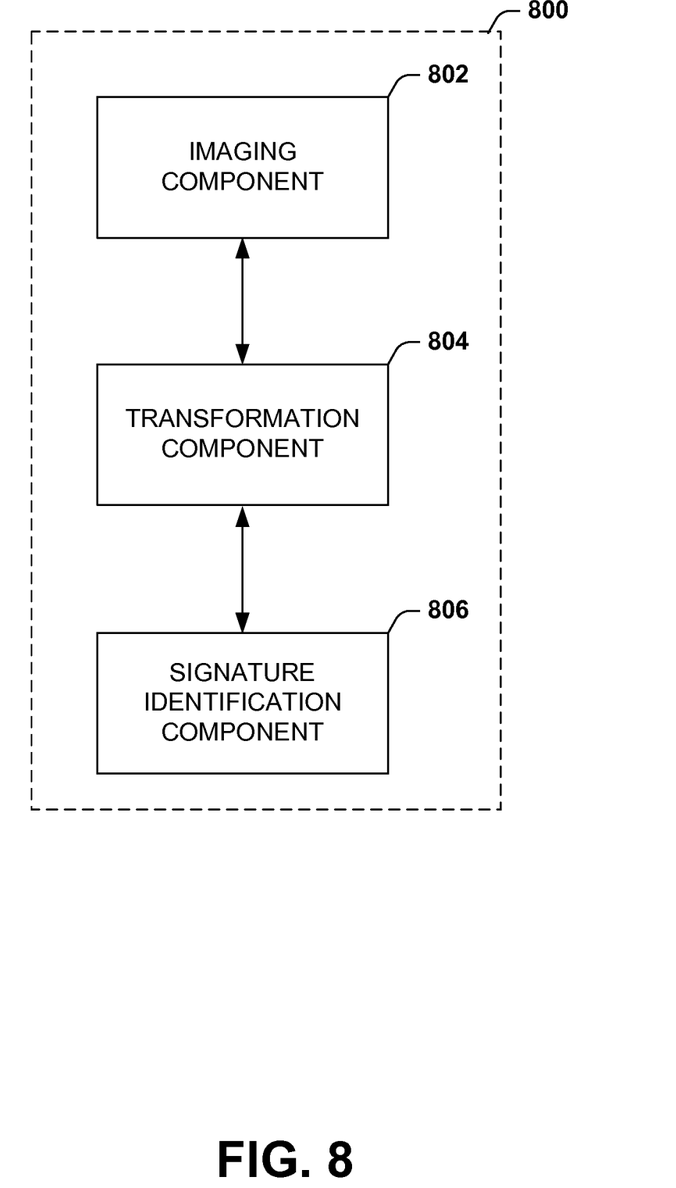
FIG. 8 is a component block diagram of a method for detecting defects on a wafer, according to some embodiments.

FIG. 8 illustrates an example system 800 for detecting defects on a wafer, such as at least one of coating defects, column defocus, or scratch-type defects. In some embodiments, the example system 800 finds applicability to detecting defects during a photolithographic process, such we when a photoresist layer is applied. In some embodiments, the example system 800 finds applicability to detecting defects during other processes, such as etching processes or other processes.

The example system 800 comprises an imaging component 802 configured to scan a wafer to acquire a non-correctable error image map indicative of non-correctable errors on the wafer. For example, the imaging component 802 comprises a laser or other measurement tool configured to measure a topography of the wafer at various locations to generate topography data. The imaging component 802 also comprises a filtering component configured to compare the topography data to a scanner profile, such as a scanner exposure profile, indicative of what the topography of the wafer is expected to be under ideal conditions. Differences between the topography data and the scanner profile are indicative of non-correctable errors. In some embodiments, an image reconstruction component of the imaging component 802 is configured to use analytical, iterative, or other image reconstruction techniques to reconstruct the data indicative of the non-correctable errors into a non-correctable error image map.

The example system 800 also comprises a transformation component 804 configured to apply one or more image transforms to the non-correctable error image map to generate a projection. In some embodiments the image transform is a feature extraction transform. In some embodiments, the image transform is a Hough transform. In some embodiments, the image transform is a Radon transform.

The example system 800 also comprises a signature identification component 806 configured to review the projection based upon a set of rules to identify a signature in the non-correctable error image map that corresponds to a defect on the wafer. By way of example, a projection yielded from a Hough transform is reviewed to determine whether one or more linear lines have a magnitude which exceeds a specified value. As another example, a projection yielded from a Radon transform is reviewed to determine whether one or more peaks are present in the projection or to determine a distribution of such peaks. In some embodiments, the presence of peaks in a Radon transform of the non-correctable error image map or the distribution of such peaks is a signature of a defect on the wafer. Accordingly, in some embodiments, the system outputs an indicator indicative of the presence of a defect on the wafer and the wafer is removed from further fabrication processes, for example.

According to an aspect of the instant disclosure a method for detecting defects on a wafer is provided. The method comprises scanning a wafer to acquire a non-correctable error image map indicative of non-correctable errors on the wafer and applying an image transform to the non-correctable error image map to generate a projection. The method also comprises reviewing the projection based upon a set of rules to identify a signature in the non-correctable error image map that corresponds to a defect on the wafer.

According to another aspect of the instant disclosure, a computer readable medium comprising processor executable instructions that when executed perform a method for detecting defects on a wafer is provided. The method comprises scanning a wafer to acquire a non-correctable error image map indicative of non-correctable errors on the wafer. The method also comprises applying an image transform to the non-correctable error image map to generate a projection, the image transform comprising a feature extraction transform. The method also comprises reviewing the projection based upon a set of rules to identify a signature in the non-correctable error image map that corresponds to a defect on the wafer.

According to yet another aspect of the instant disclosure, a system for detecting defects on a wafer during formation of a photoresist layer is provided. The system comprises an imaging component configured to scan a wafer to acquire a non-correctable error image map indicative of non-correctable errors on the wafer. The system also comprises a transformation component configured to apply an image transform to the non-correctable error image map to generate a projection, the image transform comprising at least one of a Hough transform or a Radon transform. The system also comprises a signature identification component configured to review the projection based upon a set of rules to identify a signature in the non-correctable error image map that corresponds to a defect on the wafer.

Figure 9:
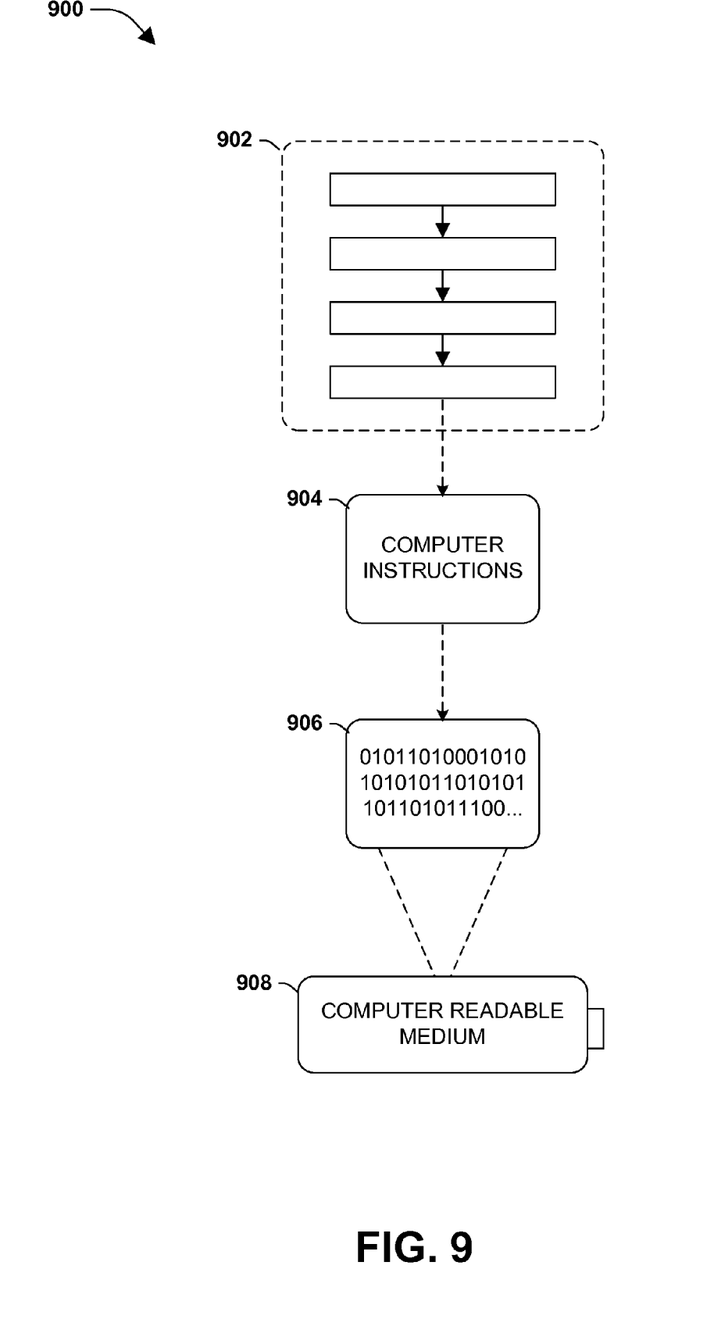
FIG. 9 is a diagram illustrating an example computer-readable medium, device, or memory comprising processor-executable instructions configured to embody one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein an implementation 900 comprises a computer-readable medium 908, such as a CD-R, DVD-R, flash drive, a platter of a hard disk drive, etc., on which is encoded computer-readable data 906. This computer-readable data 906, such as binary data comprising a plurality of zero's and one's as shown in 906, in turn comprises a set of computer instructions 904 configured to operate according to one or more of the principles set forth herein. In the illustrated embodiment 900, the processor-executable computer instructions 904 are configured to perform a method 902, such as at least some of the exemplary method 100 of FIG. 1 or exemplary method 200 of FIG. 2, for example. In other embodiments, the processor-executable computer instructions 904 are configured to implement a system such as at least some of the exemplary system 800 of FIG. 8. Many such computer-readable media are devised by those of ordinary skill in the art that are configured to operate in accordance with the techniques presented herein.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

It will be appreciated that layers, features, elements, etc. depicted herein are illustrated with particular dimensions relative to one another, such as structural dimensions and/or orientations, for example, for purposes of simplicity and ease of understanding and that actual dimensions of the same differ substantially from that illustrated herein, in some embodiments. Additionally, a variety of techniques exist for forming the layers, features, elements, etc. mentioned herein, such as implanting techniques, doping techniques, spin-on techniques, sputtering techniques such as magnetron or ion beam sputtering, growth techniques, such as thermal growth and/or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to "channel A" and "channel B," where channel A and channel B are two different channels, two identical channels, or the same channel.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method for detecting defects on a wafer, comprising:
    scanning a wafer to acquire a non-correctable error image map indicative of non-correctable errors on the wafer, wherein a pixel of the non-correctable error image map indicates a presence and a magnitude of a non-correctable error at a location on the wafer represented by the pixel, wherein the magnitude of the non-correctable error corresponds to a difference between a height of the wafer at the location and an expected height of the wafer at the location;
    applying an image transform to the non-correctable error image map to generate a projection; and
    reviewing the projection based upon a set of rules to identify a signature in the non-correctable error image map that corresponds to a defect on the wafer.

2. The method of claim 1, comprising:
    reducing a fingerprint, in the non-correctable error image map, of a tool used during a fabrication process.

3. The method of claim 2, the tool comprising at least one of a mask or a chuck used during a photolithographic process.

4. The method of claim 1, comprising:
    applying a sigma filter to the non-correctable error image map to reduce noise in the non-correctable error image map.

5. The method of claim 1, the image transform comprising a Hough transform.

6. The method of claim 1, the image transform comprising a Radon transform.

7. The method of claim 1, comprising:
    applying a second image transform to the non-correctable error image map to generate a second projection.

8. The method of claim 7, the image transform comprising a Hough transform and the second image transform comprising a Radon transform.

9. The method of claim 7, the reviewing comprising:
    reviewing the projection and the second projection based upon the set of rules to identify the signature.

10. The method of claim 1, the image transform comprising a feature extraction transform.

11. The method of claim 1, the defect comprising at least one of a coating defect, column defocus, or a scratch defect.

12. A non-transitory computer readable medium comprising processor executable instructions that when executed perform a method for detecting defects on a wafer, the method comprising:
    scanning a wafer to acquire a non-correctable error image map indicative of non-correctable errors on the wafer, wherein a pixel of the non-correctable error image map indicates a presence and a magnitude of a non-correctable error at a location on the wafer represented by the pixel, wherein the magnitude of the non-correctable error corresponds to a difference between a height of the wafer at the location and an expected height of the wafer at the location;
    applying an image transform to the non-correctable error image map to generate a projection, the image transform comprising a feature extraction transform; and reviewing the projection based upon a set of rules to identify a signature in the non-correctable error image map that corresponds to a defect on the wafer.

13. The non-transitory computer readable medium of claim 12, the method comprising:
reducing noise in the non-correctable error image map introduced by a tool used during a photolithographic process.

14. The non-transitory computer readable medium of claim 12, the method comprising:
applying a sigma filter to the non-correctable error image map to reduce noise in the non-correctable error image map.

15. The non-transitory computer readable medium of claim 12, the image transform comprising a Hough transform.

16. The non-transitory computer readable medium of claim 12, the image transform comprising a Radon transform.

17. The non-transitory computer readable medium of claim 12, the method comprising:
applying a second image transform to the non-correctable error image map to generate a second projection, and the reviewing comprising:
reviewing the projection and the second projection based upon the set of rules to identify the signature.

18. The non-transitory computer readable medium of claim 17, the image transform comprising a Hough transform and the second image transform comprising a Radon transform.

19. The non-transitory computer readable medium of claim 12, the signature corresponding to a substantially linear line having a magnitude greater than a specified threshold.

20. A method for detecting defects on a wafer during formation of a photoresist layer, comprising:
scanning a wafer to acquire a non-correctable error image map indicative of non-correctable errors on the wafer, wherein a pixel of the non-correctable error image map indicates a presence and a magnitude of a non-correctable error at a location on the wafer represented by the pixel, wherein the magnitude of the non-correctable error corresponds to a difference between a height of the wafer at the location and an expected height of the wafer at the location;
applying an image transform to the non-correctable error image map to generate a projection, the image transform comprising at least one of a Hough transform or a Radon transform; and
reviewing the projection based upon a set of rules to identify a signature in the non-correctable error image map that corresponds to a defect on the wafer.

* * * * *